United States Patent
Mashevsky et al.

(10) Patent No.: US 7,640,589 B1
(45) Date of Patent: Dec. 29, 2009

(54) DETECTION AND MINIMIZATION OF FALSE POSITIVES IN ANTI-MALWARE PROCESSING

(75) Inventors: Yuri V. Mashevsky, Moscow (RU); Yuri V. Namestnikov, Moscow (RU); Nikolay V. Denishchenko, Moscow (RU); Pavel A. Zelensky, Moscow (RU); Igor G. Chekunov, Moscow (RU); Andrey A. Efremov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 12/487,713

(22) Filed: Jun. 19, 2009

(51) Int. Cl.
- G06F 11/00 (2006.01)
- G06F 12/14 (2006.01)
- G06F 12/16 (2006.01)
- G08B 23/00 (2006.01)

(52) U.S. Cl. .......................................... 726/24; 726/25
(58) Field of Classification Search .................. 726/22, 726/23, 24, 25
See application file for complete search history.

(56) References Cited

U.S. PATENT DOCUMENTS

| | | | | |
|---|---|---|---|---|
| 4,456,922 | A * | 6/1984 | Balaban et al. ............. | 348/665 |
| 4,464,675 | A * | 8/1984 | Balaban et al. ............. | 348/665 |
| 4,500,912 | A * | 2/1985 | Bolger ........................ | 348/665 |
| 5,596,712 | A * | 1/1997 | Tsuyama et al. ............. | 714/26 |
| 6,535,553 | B1 * | 3/2003 | Limberg et al. ............. | 375/232 |
| 6,831,659 | B1 * | 12/2004 | Mukoyama et al. ......... | 345/619 |
| 6,898,528 | B2 * | 5/2005 | Zorka et al. ................. | 701/301 |
| 7,320,020 | B2 * | 1/2008 | Chadwick et al. ........... | 709/206 |
| 7,386,417 | B1 * | 6/2008 | Bao et al. .................... | 702/179 |
| 7,523,168 | B2 * | 4/2009 | Chadwick et al. ........... | 709/206 |
| 7,587,761 | B2 * | 9/2009 | Duffield et al. .............. | 726/22 |
| 7,603,472 | B2 * | 10/2009 | Petry et al. ................... | 709/230 |
| 2003/0033260 | A1 * | 2/2003 | Yashiro et al. .............. | 705/400 |
| 2004/0019425 | A1 * | 1/2004 | Zorka et al. ................. | 701/301 |
| 2004/0210640 | A1 * | 10/2004 | Chadwick et al. ........... | 709/207 |
| 2005/0035979 | A1 * | 2/2005 | Mukoyama et al. ......... | 345/619 |
| 2005/0125513 | A1 * | 6/2005 | Sin-Ling Lam et al. ..... | 709/220 |
| 2005/0197542 | A1 * | 9/2005 | Bazin et al. ................. | 600/300 |
| 2005/0267941 | A1 * | 12/2005 | Addante et al. ............. | 709/206 |
| 2005/0283603 | A1 * | 12/2005 | Raman et al. ............... | 713/152 |
| 2006/0075504 | A1 * | 4/2006 | Liu ............................. | 726/25 |
| 2006/0130141 | A1 * | 6/2006 | Kramer et al. ............... | 726/23 |

(Continued)

OTHER PUBLICATIONS

Lin et al., High-Speed Detection of Unsolicited Bulk Emails, Dec. 2007, ACM.*

Primary Examiner—David Garcia Cervetti
(74) Attorney, Agent, or Firm—Bardmesser Law Group (57) ABSTRACT

A system, method and computer program product for detection of false positives occurring during execution of anti-malware applications. The detection and correction of the false positives is implemented in two phases, before creation of new anti-virus databases (i.e., malware black lists) or before creation of new white lists, and after the anti-virus databases or new white lists are created and new false positives are detected. The system calculates a probability of detection of a certain potential malware object. Based on this probability, the system decides to either correct a white list (i.e., a collection of known clean objects) or update a black list (i.e., a collection of known malware objects). A process is separated into a several steps: creation and update (or correction) of white lists; creation and update of black lists; detection of collisions between these lists and correction of black lists or white lists based on the detected collisions.

11 Claims, 12 Drawing Sheets

U.S. PATENT DOCUMENTS

| | | | |
|---|---|---|---|
| 2006/0153459 A1* | 7/2006 | Zhang et al. | 382/224 |
| 2006/0174344 A1* | 8/2006 | Costea et al. | 726/24 |
| 2006/0195542 A1* | 8/2006 | Nandhra | 709/207 |
| 2006/0282894 A1* | 12/2006 | Duffield et al. | 726/23 |
| 2007/0005713 A1* | 1/2007 | LeVasseur et al. | 709/206 |
| 2007/0005714 A1* | 1/2007 | LeVasseur et al. | 709/206 |
| 2007/0005716 A1* | 1/2007 | LeVasseur et al. | 709/206 |
| 2007/0005717 A1* | 1/2007 | LeVasseur et al. | 709/206 |
| 2007/0074169 A1* | 3/2007 | Chess et al. | 717/126 |
| 2007/0113101 A1* | 5/2007 | LeVasseur et al. | 713/189 |
| 2007/0121596 A1* | 5/2007 | Kurapati et al. | 370/356 |
| 2007/0124235 A1* | 5/2007 | Chakraborty et al. | 705/38 |
| 2007/0162584 A1* | 7/2007 | Kokusho et al. | 709/223 |
| 2007/0162975 A1* | 7/2007 | Overton et al. | 726/24 |
| 2007/0204026 A1* | 8/2007 | Berger | 709/223 |
| 2008/0040804 A1* | 2/2008 | Oliver et al. | 726/25 |
| 2008/0059198 A1* | 3/2008 | Maislos et al. | 704/273 |
| 2008/0133682 A1* | 6/2008 | Chadwick et al. | 709/206 |
| 2008/0168135 A1* | 7/2008 | Redlich et al. | 709/204 |
| 2008/0229421 A1* | 9/2008 | Hudis et al. | 726/25 |
| 2008/0229422 A1* | 9/2008 | Hudis et al. | 726/25 |
| 2008/0244009 A1* | 10/2008 | Rand et al. | 709/206 |
| 2008/0259867 A1* | 10/2008 | Guo | 370/330 |
| 2008/0270549 A1* | 10/2008 | Chellapilla et al. | 709/206 |
| 2009/0044024 A1* | 2/2009 | Oberheide et al. | 713/188 |
| 2009/0077664 A1* | 3/2009 | Hsu et al. | 726/24 |
| 2009/0089869 A1* | 4/2009 | Varghese | 726/7 |
| 2009/0177913 A1* | 7/2009 | Quinn et al. | 714/4 |
| 2009/0178144 A1* | 7/2009 | Redlich et al. | 726/27 |
| 2009/0254572 A1* | 10/2009 | Redlich et al. | 707/10 |

* cited by examiner

DETECTION AND MINIMIZATION OF FALSE POSITIVES IN ANTI-MALWARE PROCESSING

BACKGROUND OF THE INVENTION

1. Field of the Invention

The present invention is related to anti-malware technology, and more particularly, to detection and minimization of false positives occurring during anti-malware processing.

2. Description of the Related Art

Detection of viruses and malware has been a concern throughout the era of the personal computer. With the growth of communication networks such as the Internet and increasing interchange of data, including the rapid growth in the use of e-mail for communications, infection of computers through communications or file exchanges is an increasingly significant consideration. Infections take various forms, but are typically related to computer viruses, Trojan programs or other forms of malicious code (i.e., malware).

Recent incidents of e-mail mediated virus attacks have been dramatic both for the speed of propagation and for the extent of damage, with Internet service providers (ISPs) and companies suffering service problems and a loss of e-mail capability. In many instances, attempts to adequately prevent file exchange or e-mail mediated infections significantly inconvenience computer users. Improved strategies for detecting and dealing with virus attacks are desired.

One conventional approach to detecting viruses is signature scanning. Signature scanning systems use sample code patterns extracted from the known malware code and scan for the occurrence of these patterns in other program codes. A primary limitation of the signature scanning method is that only the known malicious code is detected, that is, only the code that matches the stored sample signatures of known malicious code is identified as being infected. All viruses or a malicious code not previously identified, and all viruses or a malicious code created after the last update to the signature database will not be detected.

In addition, the signature analysis technique fails to identify the presence of a virus if the signature is not aligned in the code in the expected fashion. Alternatively, the authors of a virus may obscure the identity of the virus by an opcode substitution or by inserting dummy or random code into virus functions. A nonsense code that alters the signature of the virus to a sufficient extent as to be undetectable by a signature scanning program without diminishing the ability of the virus to propagate and deliver its payload.

Another virus detection strategy is integrity checking. Integrity checking systems extract a code sample from the known, benign application program code. The code sample is stored together with the information from the program file, such as the executable program header and the file length, as well as the date and the time stamp of the sample. The program file is checked at regular intervals against this database to ensure that the program file has not been modified.

Integrity checking programs generate long lists of modified files when a user upgrades the operating system of the computer or installs or upgrades the application software. The main disadvantage of an integrity check-based virus detection system is that a great many warnings of virus activity issue whenever any modification of an application program is performed. It becomes difficult for a user to determine when a warning may represent a legitimate attack on the computer system.

Checksum monitoring systems (and generally, control sum or hash monitoring systems) detect viruses by generating a cyclic redundancy check (CRC) value for each program file. Modification of the program file is detected by a difference in the CRC value. Checksum monitors improve integrity check systems by the fact that the malicious code can hardly defeat the monitoring. On the other hand, checksum monitors exhibit the same limitations as integrity checking systems issuing too many false warnings, and to identify which warnings represent actual viruses or infection gets difficult.

An effective conventional approach uses the so-called white lists, i.e. the lists of known "clean" software components, links, libraries and other clean objects. In order to compare a suspect object against the white list, hash values can be used. The use of hashes is disclosed, for example, in WO/2007066333 where the white list consists of hashes of known clean applications. In WO/2007066333, checksums are calculated and compared against the known checksums.

To be effective, the white lists have to be constantly updated as disclosed, for example, in US 2008/0168558, which uses ISP for white list updates. In the US 2008/0104186, the white list is updated using some information derived from the content of a message. Also, in US 2007/0083757, it is determined whether a white list needs to be corrected and the last version of a white list is retrieved if correction is required.

When white lists are used, some false positive determinations are inevitably made. The false positives must be detected, as they can cause perhaps almost as much harm as a malware. For example, a legitimate component can be "recognized" by the AV software to be malware, causing severe damage to the reputation of the AV software vendor, and annoyance and wasted time for many users. Another scenario occurs when a malware is misconsidered to be a "clean" component which harms the system. Currently, false positives are detected and the white lists are corrected manually. It takes a relatively long time, often many hours, and sometimes as long as a day or two, since the process is to a large degree manual, requiring an analyst's participation, which does not prevent from occurrences of the same false positive for many users, before the white lists are updated and then distributed.

Detection of false positives is disclosed in US 2008/0168558, where false positives are detected by comparison of various threat reports. A security system which takes into consideration the values of false positives is disclosed in WO/03077071.

However, conventional systems do not provide an effective and robust update of the white lists based on detected false positives. For example, in US 2006/0206935, minimization of risk false positives is discussed, but how to correct the white lists is not suggested.

In WO/9909507, neural networks are used for minimization of false positives. However, this reference does not cover correction of the white lists. In US2007/0220043, parameters such as vendor, product version and product name are used for estimation of a potential threat. However, these parameters are not used for correction of a white list. Other conventional systems use software license information for including the software into a white list.

In other systems digital signatures are used for placing an object into a white or into a black (i.e., malware) list. For example, in the WO/2007143394, a digital signature is included in the white list. However, correction and update of the white list is not disclosed either.

It is apparent that improved techniques for maintaining, correcting and updating the white lists and the black lists are desired. Accordingly, there is a need in the art for a system and method that addresses the need for detection and minimization of false positives occurring during anti-malware processing.

SUMMARY OF THE INVENTION

The present invention is intended as a method and system for detection and minimization of false positives occurring during anti-malware processing, that substantially obviates one or several of the disadvantages of the related art.

In one aspect of the invention there is provided a system, method and computer program product for detection of false positive occurring during execution of anti-malware applications. According to an exemplary embodiment, the detection and correction of the false positives is implemented in two phases: before creation of new anti-virus databases (i.e., malware black lists) and after the anti-virus database is created and new false positives are detected.

The system calculates a probability of detection of a potential malware object. Based on this probability, the system decides to either correct a white list (i.e., a collection of known clean objects) or update a black list (i.e., a collection of known malware objects).

In one embodiment, a process can be separated into several steps: creation and update or correction of white lists; creation and update of black lists; detection of collisions between these lists and correction of white lists and black lists based on the collisions.

Additional features and advantages of the invention will be set forth in the description that follows, and in part will be apparent from the description, or may be learned by practice of the invention. The advantages of the invention will be realized and attained by the structure pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method, system and computer program product for detection of false positives and correction of a white list is provided. The proposed method and system also provide for timely update of black lists (i.e., AV databases).

In one aspect of the invention there is a system, method and computer program product for detection of false positive occurring during execution of anti-malware applications. According to the exemplary embodiment, the detection and correction of the false positives is implemented in two phases—before creation of new anti-virus databases (i.e., malware black lists) and after the anti-virus database is created and new false positives are detected. The system calculates a probability of detection of a certain potential malware object. Based on this probability, the system decides to either correct a white list (i.e., a collection of known clean objects) or update a black list (i.e., a collection of known malware objects).

In one embodiment, a process is separated into several steps: creation and update or correction of white lists; creation and update of black lists; detection of collisions between these lists; and correction of white lists based on the detected collisions. A statistical system of the exemplary embodiment provides collision analyses and corrects white and black lists.

In one embodiment, a method for a white list creation is provided. In another embodiment a method for adding applications (or executable components) to a white list is based on various parameters. According to the exemplary embodiment, a white list is created employing several methods based on hash values, on license agreement of an application, on a digital signature, on a context of an object, based on user statistics and other criteria.

Figure 1:
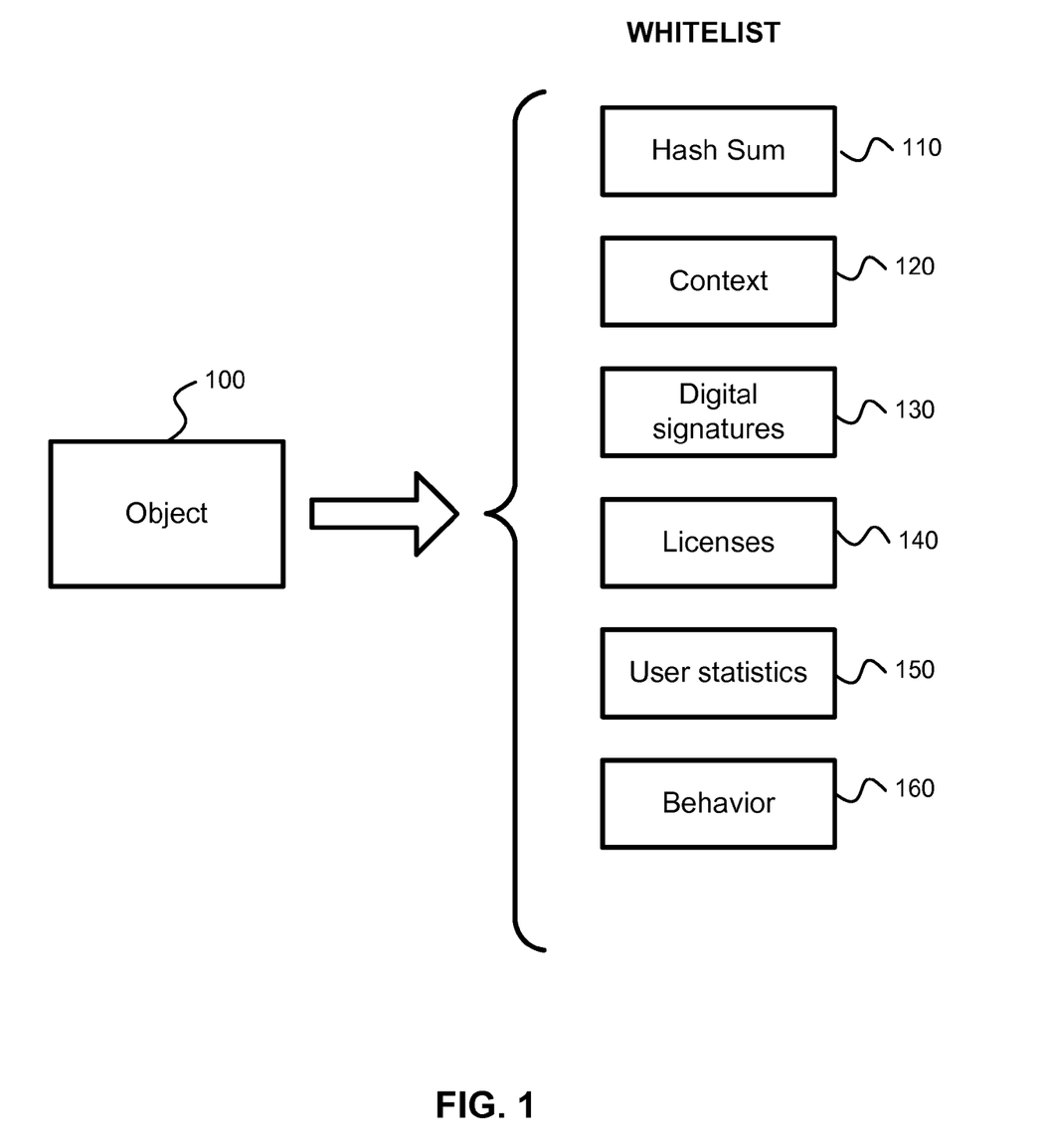
FIG. 1 illustrates a method for placing an object into a white list based on different criteria, in accordance with the exemplary embodiment.

The white list is created for file objects, links, mail messages and their senders, as well as for other objects, such as instant messenger accounts and logs and addresses, host names, IP addresses, domain names, identifiers of advertising vendors (e.g., Google Adsense). The listed methods for filling up a white list are illustrated in FIG. 1. These methods allow a gradual fillup of the white list by analyzing the already released clean objects (such as applications) 100. However, these methods cannot analyze the entire clean information stream due to its enormous volume.

In particular, it is difficult to analyze applications using hash value calculations 110, since the hash value changes for each new version of a released application. Use of a license agreement 140 can also be problematic, since it is not always available and developers approach it different ways. Note that while the hash values 110 are usually calculated using MD5 algorithm, they can be calculated using any hash function, e.g., MD4, SHA1, SHA2, SHA256, etc.

The user statistics 150 can help to fill up the white list. For example, if an unknown object 100 (i.e., an application or an executable component) has been marked by a majority of users as "clean," it can be, at least temporarily, considered clean and added to the white list.

An object can also be added to the white list based on its behavior 160 within a system. For example, when execution of a file "photoshop.exe" is detected, by its launch from C:\ProgramFiles\Adobe Photoshop creating a link to a server using a URL White List and not exhibiting any of malware properties, the system can add file identification data into a list File White List.

Figure 2:
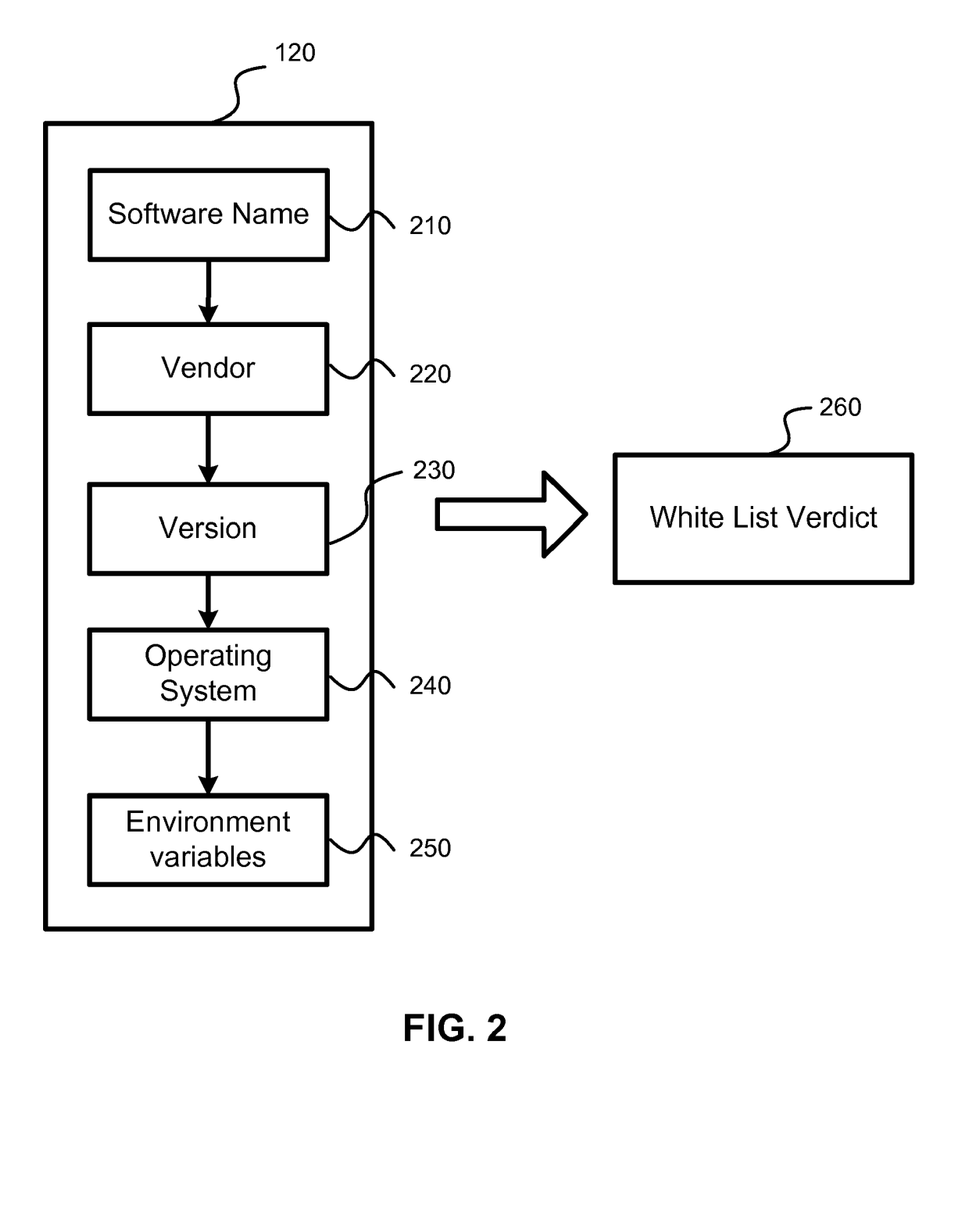
FIG. 2 illustrates a context-based verdict generation, in accordance with the exemplary embodiment.

An object can also be placed into the white list based on its context 120 as illustrated in FIG. 2. The object can be white list based on its name 210. It can also be placed into the white list based on its vendor 220 or a product version 230. An Operating System 240 and environment variables 250 can be taken in consideration in making white list verdict 260. The most comprehensive white list verdict 260 is made using the entire context 120.

For example, a newly released version of MS Internet Explorer can be placed into the white list, provided that its previous version was white listed under the equal circumstances. It will be appreciated that the decision is essentially probabilistic, usually based on several criteria, such as whether the previous version was white listed, a context, a vendor name, a source of file, environmental variables and other factors.

Another example of using context 120 can be placing an object into white list on account of the information about its distribution source. For example, it can be applicable to software downloaded from the trusted Internet nodes (URL White List).

Another exemplary embodiment is directed to detecting collisions between the white list and the black list. For example, an object is determined to be a malware component and is subsequently blacklisted. However, this object was previously placed in the white list. If it is determined that this object was placed into the black list prematurely or by mistake (and the object is in fact "clean"), this fact is considered to be a false positive and is treated accordingly.

Figure 3:
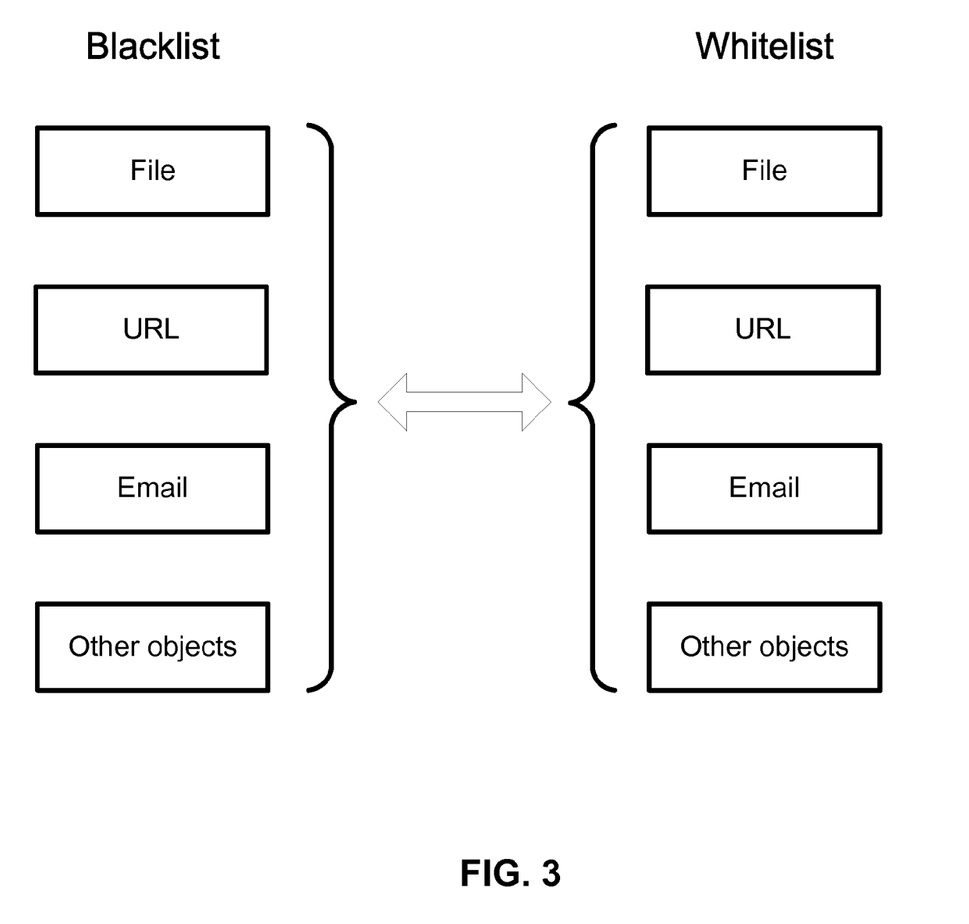
FIG. 3 illustrates a variety of possible collisions between various objects of the white list and the black list, in accordance with the exemplary embodiment.

A variety of possible collisions between various objects of the white list and the black list are illustrated in FIG. 3. The collisions can occur between all types of objects, such as files, links (URLs), email messages, email senders, etc.

Figure 4:
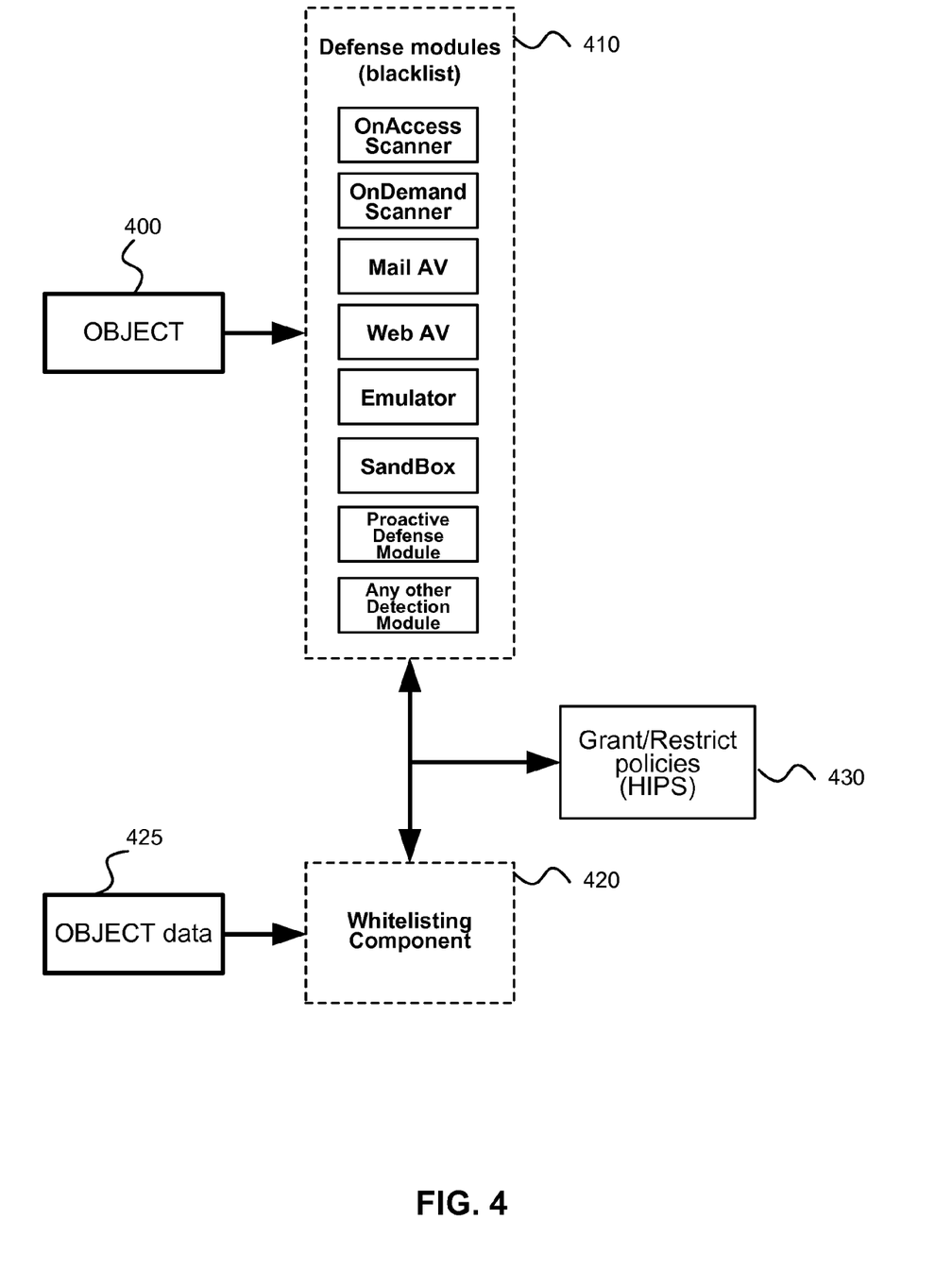
FIG. 4 illustrates a malware defense system, in accordance with the exemplary embodiment.

FIG. 4 illustrates a malware defense system, in accordance with the exemplary embodiment. Defense modules 410 are used to block an object 400. At the same time, a false positive detection system 420 can detect collision, if it is established that the object 400 is a clean object by a white listing component 430. The white listing component 430 makes the determination basing on object data 425. Then, depending on the reliability of the white listing component 430, HIPS (host intrusion prevention system) logic 440 can be used.

According to the exemplary embodiment, there are two types of collisions, —before and after generation of false positive records. Thus, false positive records can be generated and appropriate corrections can be made to either white or black lists. Alternatively, a possibility of false positives can be minimized so false positive records be not generated. Detection of recorded false positives is implemented during processing incoming statistical data. Generation of false positive records is performed at any attempt by an analyst to add a new record into a white or a black list.

Figure 5:
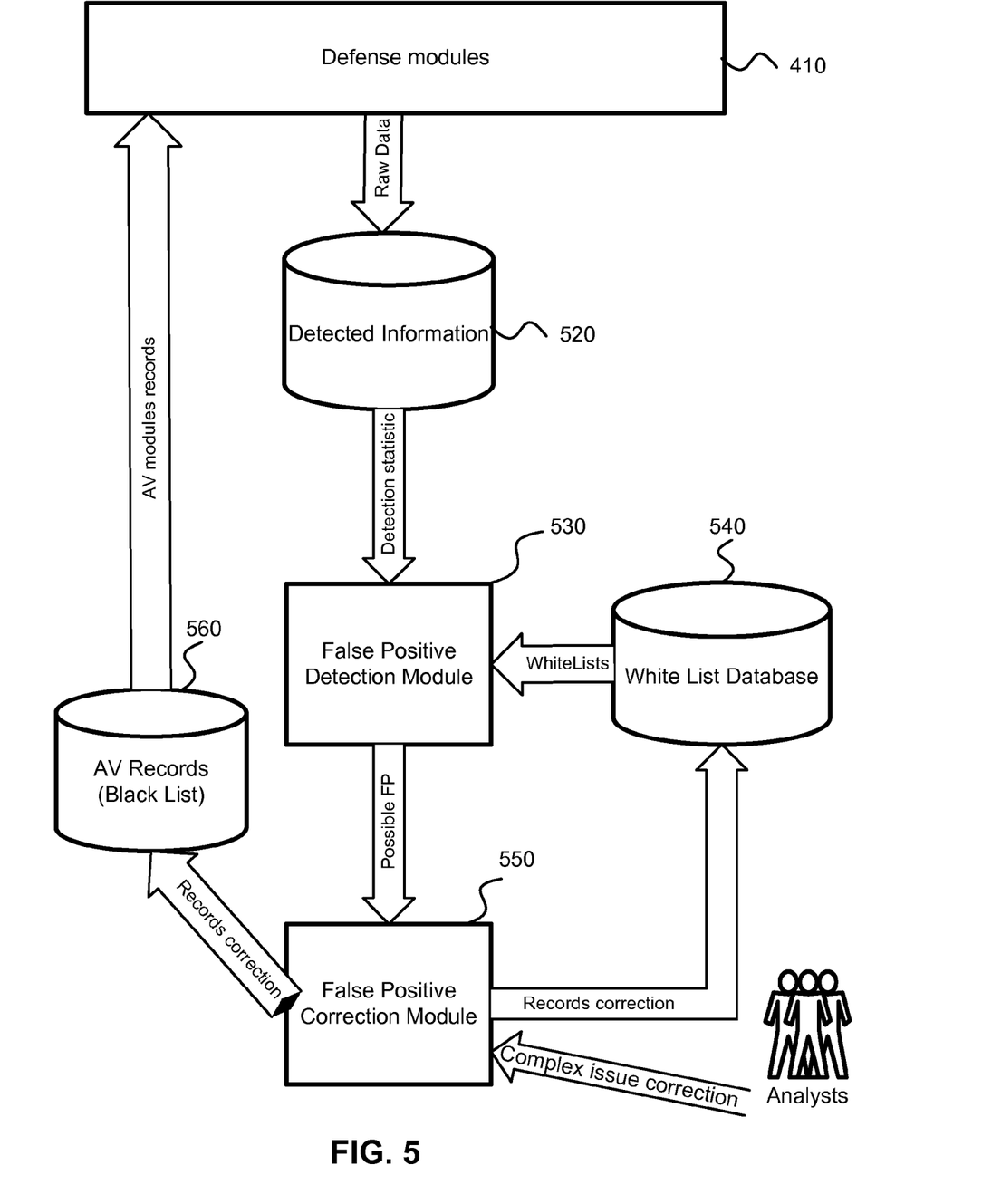
FIG. 5 illustrates an architecture used for detection of generated false positive records, in accordance with the exemplary embodiment.

An architecture used for detection of generated false positive records is illustrated in FIG. 5. Defense modules 410 of an AV system send raw data (i.e., statistics). In order to detect and correct recorded false positives, a number of records of detected objects are derived from the raw data and stored in a database 520. These records (i.e., detection statistics) pass to a false positive detection module 530, where the detection records are compared with records of clean objects stored in a white list database 540. Different comparison algorithms depicted in FIG. 1 are used for detecting collisions.

In this case, a collision occurs when an object detected by the defense module 410 is present in the white list. All of the suspected objects (or objects' metadata) and corresponding to them AV records from a database 560 are provided to a false positive correction module 550. The module 550 calculates a probability of an error of the defense module 410 and a probability of a malware object included into the white list. Once these probabilities are analyzed, the false positive correction module 550 comes up with a verdict to either correct records in the white list database 540, or to make corrections to the AV database 560 containing black lists of known malware objects. In some complex cases, a human intervention by an expert analyst is needed to make a final verdict.

Figure 6A:
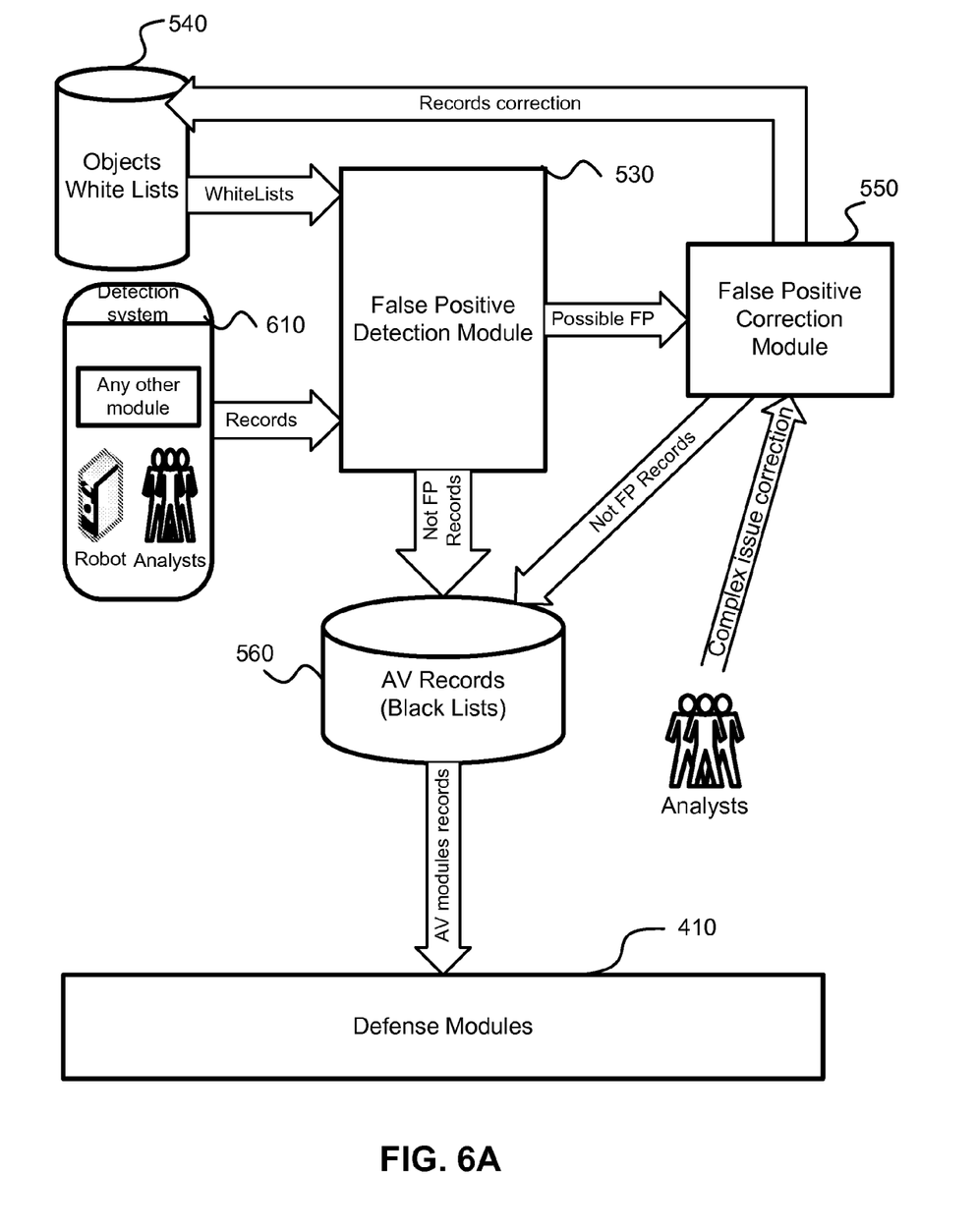
FIG. 6A illustrates an architecture used for minimization of false positive records in the white list, in accordance with the exemplary embodiment.

An architecture used for minimization of generation of false positive records is illustrated in FIG. 6A. This architecture provides for minimization of a possibility of false positives by their detection and correction at a point of adding a record to databases of white or black lists. Records are generated by a detection system 610. The detection system can have automatic systems (i.e., robots), other modules and human analysts. The records are provided to the false positive detection module 530. Then, all detected objects (or objects' metadata) and their corresponding AV records 560 are sent to the false positive correction module 550.

Figure 6B:
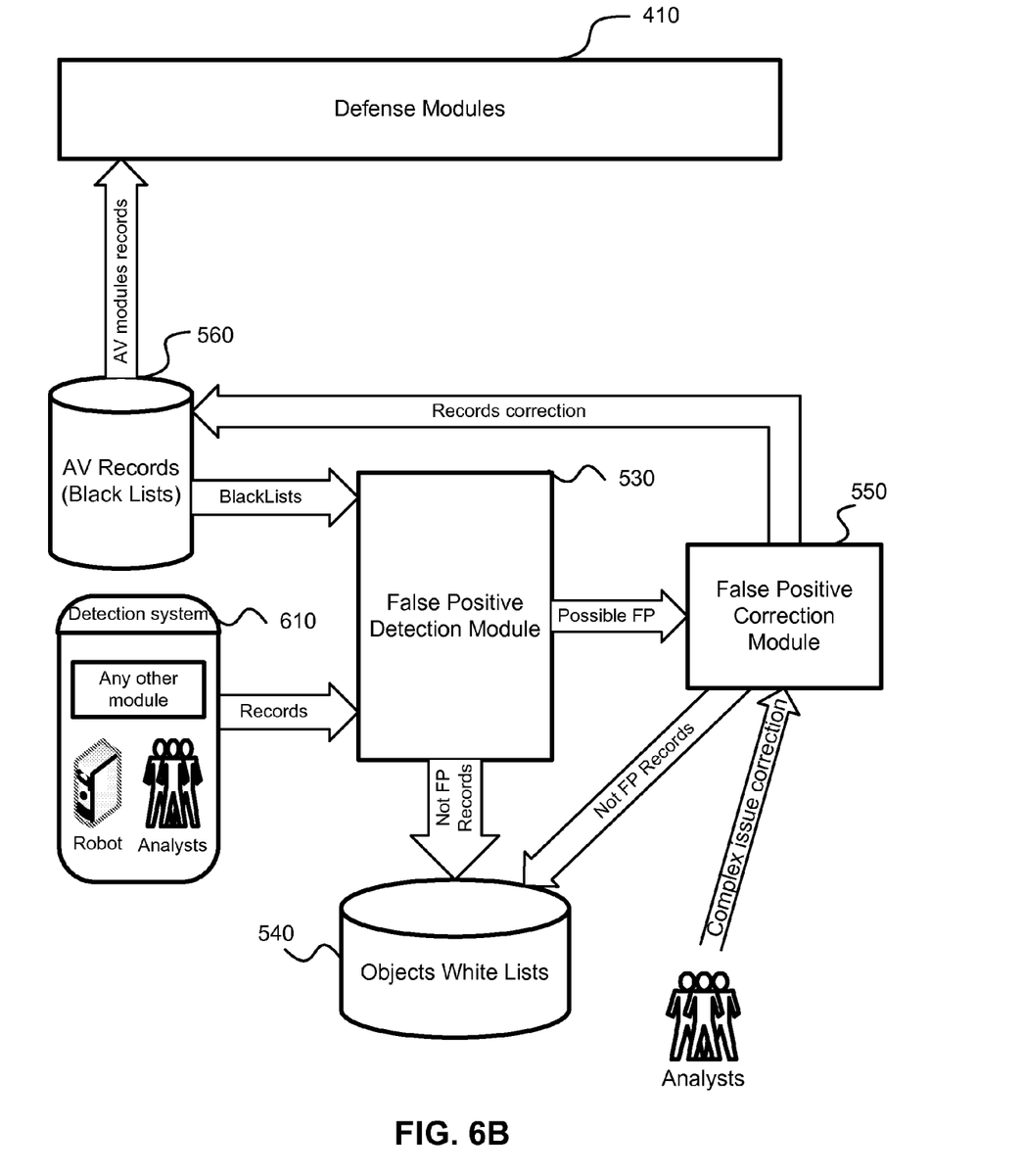
FIG. 6B illustrates an architecture used for minimization of false positive records in the black list, in accordance with the exemplary embodiment.

FIG. 6B illustrates a similar process, except for where the black list is corrected instead of the white list.

A probability of an error of the detection system 610 and a probability of a malware object included into the white list 540 are calculated in the false positive correction module 550. Upon these probability are analyzed, the false positive correction module 550 comes up with the verdict to either correct records in the white list database 540, or to make corrections to the AV database 560 containing black lists of the known malware objects.

In some complex cases, an intervention by an expert analyst is vital for a verdict determination. Thus, the databases 540 and 560 are corrected, and the defense modules 410 can refer to an already updated AV records database 560.

Figure 7A:
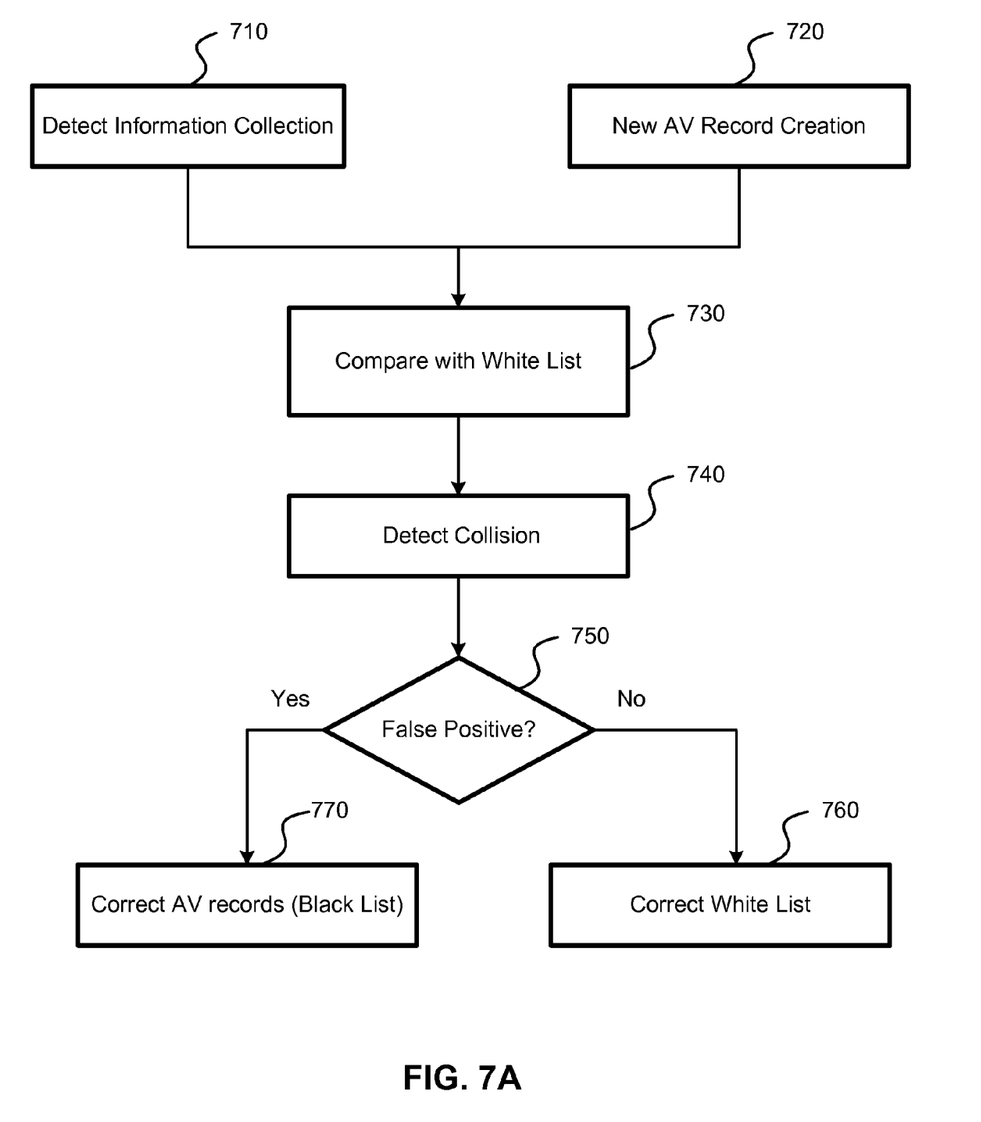
FIG. 7A illustrates a method for correction of white and black lists, where an attempt is made to modify the black list, in accordance with the exemplary embodiment.

FIG. 7A illustrates a method for correction of white and black lists, in accordance with the exemplary embodiment. A new AV record is created in step 720. Detected information related to suspect objects is collected in step 710. The data produced at steps 710 and 720 is compared against a white list in step 730. Then, in step 740, collision is detected. If, in step 750, the collision is determined not to be false positive, the white list is corrected in step 760. If, in step 750, the collision is determined to be a false positive event, the AV records (i.e., black list) are corrected.

Figure 7B:
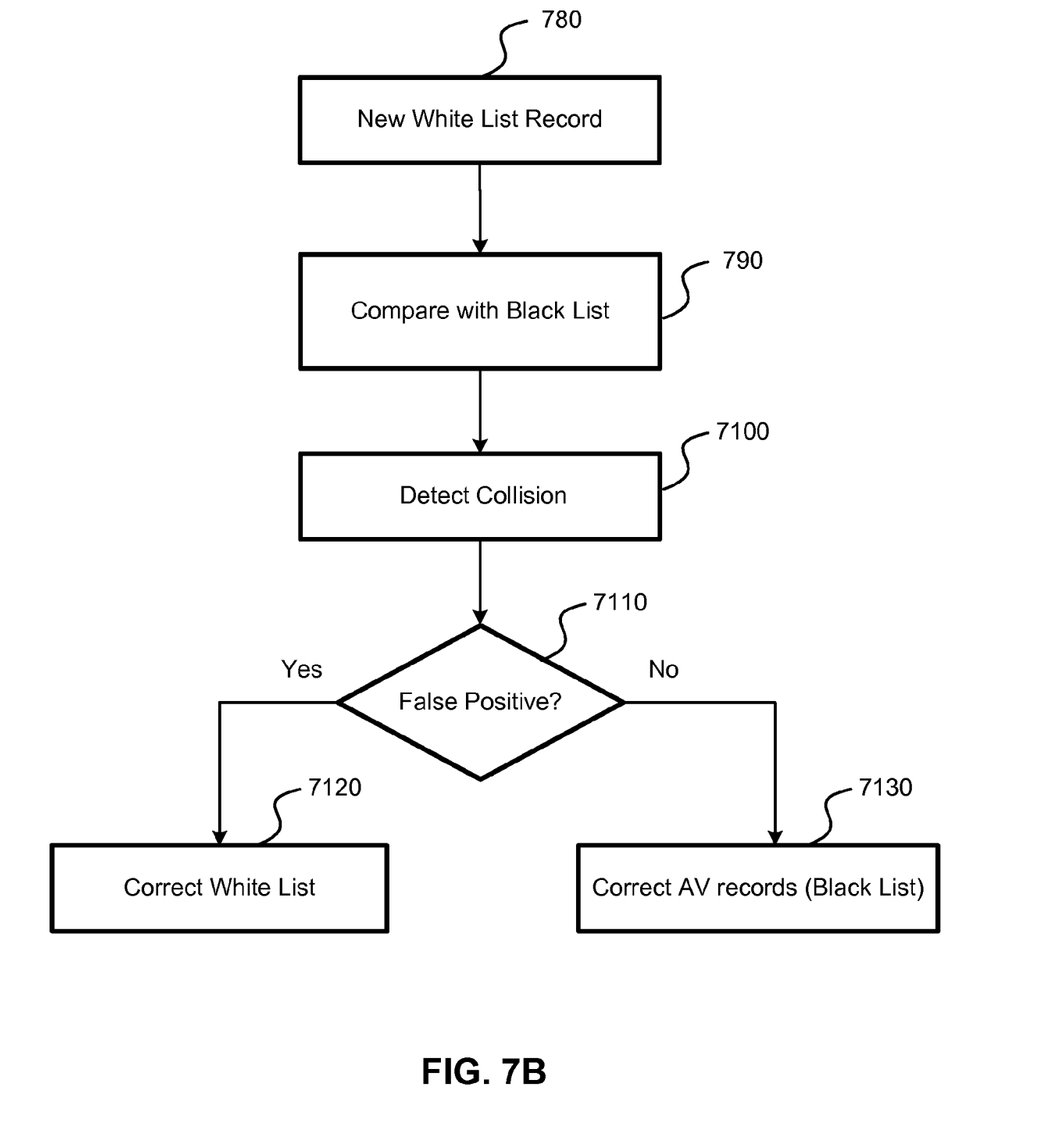
FIG. 7B illustrates a method for correction of white and black lists, where an attempt is made to modify the white list, in accordance with the exemplary embodiment.

FIG. 7B illustrates a similar process for correction of white and black lists, where an attempt is made to modify the white list first.

Figure 8:
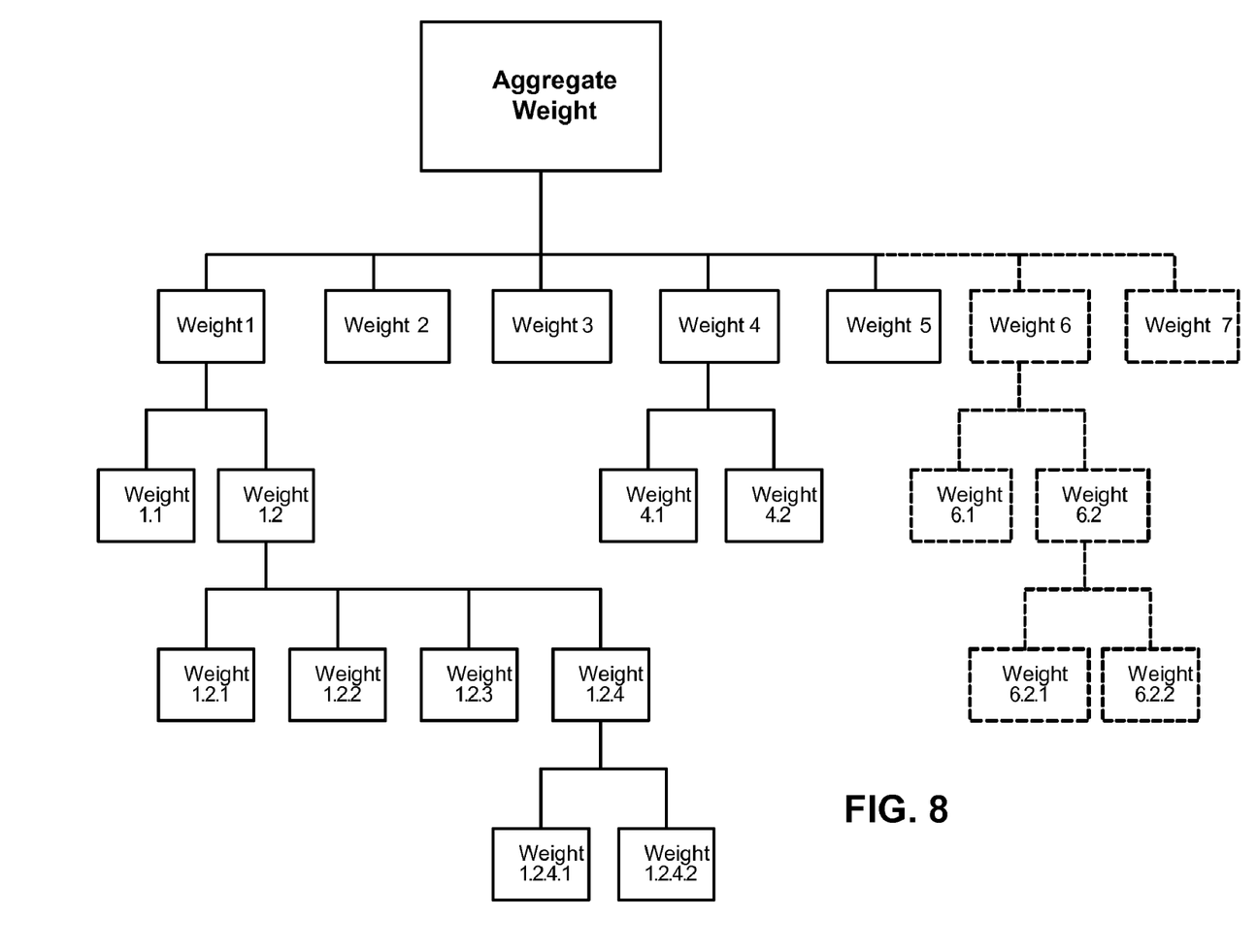
FIG. 8 illustrates an exemplary tree of weight coefficients, in accordance with the exemplary embodiment.
Figure 9:
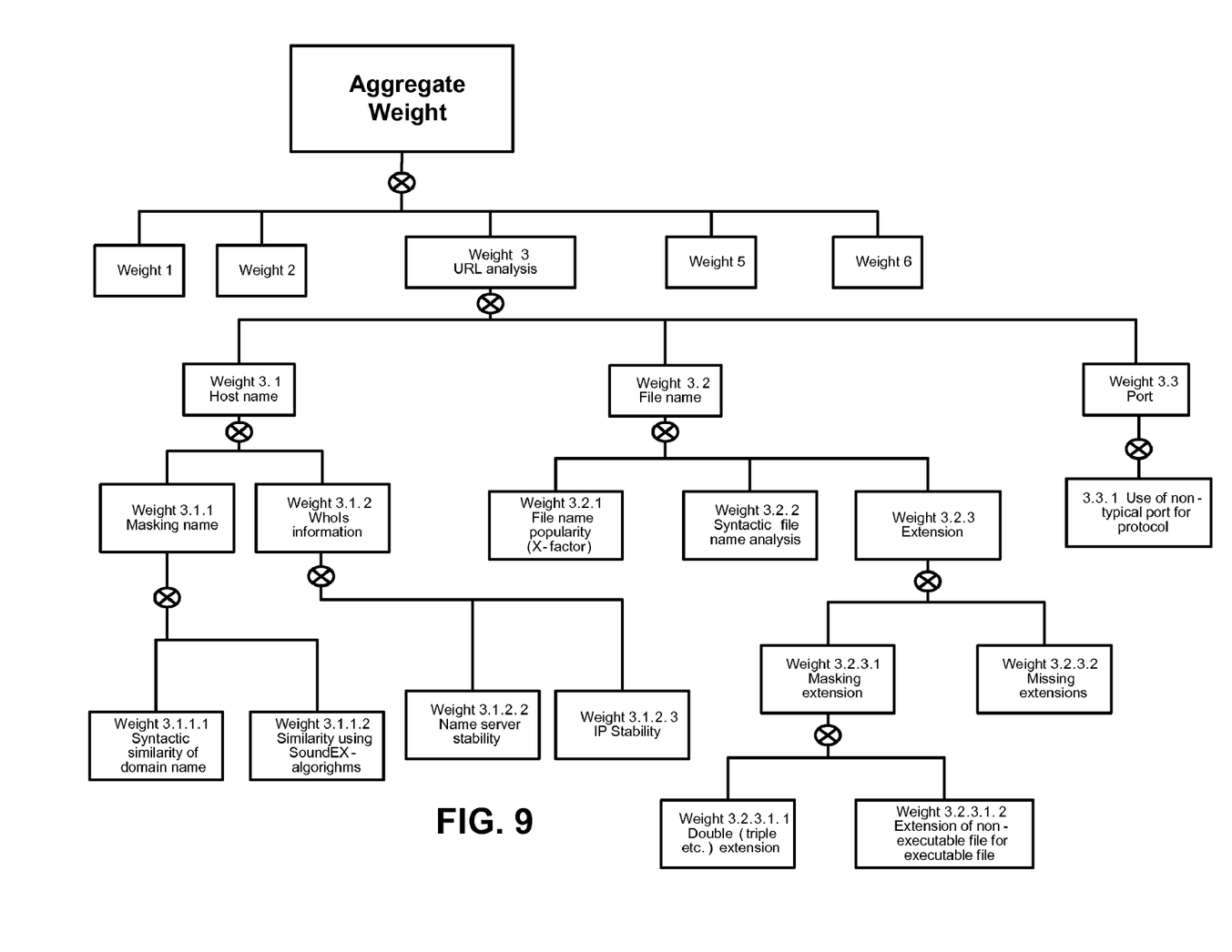
FIG. 9 illustrates a particular example of the tree of FIG. 8.

According to the exemplary embodiment, when a collision is detected, the system generates a tree of weight coefficients. An exemplary tree of weight coefficients is depicted in FIG. 8. Each coefficient weight represents a probability of a false positive based on a certain criteria. The Aggregate Weight represents a probability of the false positive used for verdict determination. The Aggregate Weight is a number from 0 to 100, with 0 being representation of a clean object sent to a white list and 100 representing malware (i.e., a black listed object placed in AV database). Anything in between is decided on a relative probability. Borderline cases in the area of Weight 50 are decided by the expert analysts. The weight coefficient tree is created for each collision (i.e., suspected false positive). The weight coefficients are calculated based on a certain criteria. For example, en executable file (i.e., object) has been downloaded by a system. If it is a first occurrence of this object, the weight coefficient tree, shown in FIG. 9, is generated by the system.

Then, for example, weight 3 represents URL analysis calculated as a sum of a host name (weight 3.1), a file name (weight 3.2) and a port (weight 3.3). The weight 3 probability based on the host name criteria is calculated from masking name (weight 3.1.1) and whois information (weight 3.1.2). In turn, the masking name probability is calculated on the syntactic similarity of domain name (weight 3.1.1.1) and a similarity of the soundEX algorithms (weight 3.1.1.2).

The whois information is calculated in terms of the name server stability criteria (weight 3.1.2.2) and IP stability (weight 3.1.2.3). The file name (weight 3.2) is obtained as a sum of file name popularity factor (X-factor) (weight 3.2.1) and syntactic file name analysis (weight 3.2.2) and file extension (weight 3.2.3). The file extension is a sum of masking extension (weight 3.2.3.1) and missing extensions (3.2.3.2). In turn, the masking extension results from as a sum of double (triple, etc.) extension (weight 3.2.3.1.1) and extension of non-executable file for executable file (weight 3.2.3.1.2).

The port (weight 3.3) is calculated as a usage probability of non-typical port for a protocol (weight 3.3.1). Thus, the aggregate weight is obtained as a sum of all probabilities calculated for each of the criteria. On such a comprehensive parameter, an accurate verdict regarding the downloaded executable file can be generated. FIG. 8 illustrates a particular example of the tree of FIG. 8.

Figure 10:
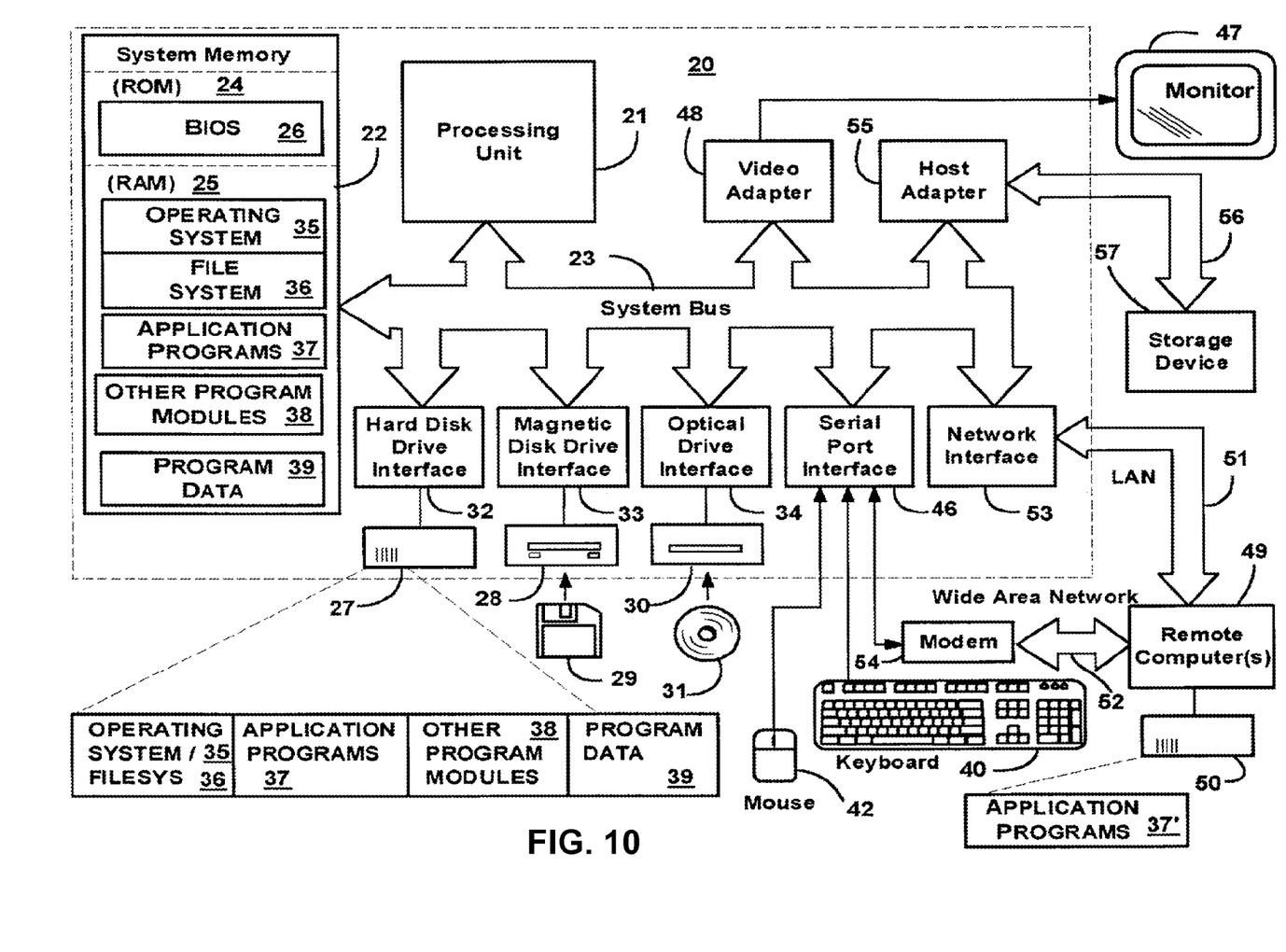
FIG. 10 illustrates a schematic of an exemplary computer system on which the invention can be implemented.

With reference to FIG. 10, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any bus architecture. The system memory includes a read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk (not shown) a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide a non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 coupled to the system bus, and may be connected by another interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be represented by another computer, a server, a router, a network PC, a peer device or other common network node, and typically includes many or all of the elements described relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be both internal and external, is connected to the system bus 23 via the serial port interface 46. In a networked environment, the program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for an effective detection and minimization of false positives occurring during anti-malware processing. It should also be appreciated that various modifications, adaptations and alternative embodiments thereof may be made within the scope and spirit of the present invention. The invention is further defined by the following claims.

What is claimed is:

1. A method for protecting against malware and correcting a white list, the method being performed on a computer having a processor and a memory, the method comprising:
   (a) creating a white list of clean objects and a black list of malicious objects;
   (b) collecting metadata related to a suspicious object;
   (c) adding a new malware-related record to a black list or adding a new white list record based on the metadata;
   (d) comparing the metadata and the malware-related record against the white list or the metadata and a new white list record against the black list;
   (e) detecting a collision due to an object being assigned to the wrong list;
   (f) analyzing the collision and, if the collision is a false positive event, correcting the black list and correcting the white list if the collision is a false negative event.

2. The method of claim 1, wherein the white list is created based on object's parameters including any of:
   a hash value;
   a context;
   a signature;
   a license;
   user statistics; and
   behavior.

3. The method of claim 2, wherein the object context comprises:
   a software name;
   a vendor information;
   a product version;
   an operating system used; and
   environment variables.

4. The method of claim 1, wherein the object is any of:
   a file;
   a URL;
   as instant messenger account;
   a host name;
   an IP addresses;
   a domain name; and
   an email message.

5. The method of claim 1, further comprising creating a weight coefficient tree upon the collision detection.

6. The method of claim 5, wherein the weight coefficient tree comprises a plurality of probabilities of the false positive calculated as a different criteria.

7. The method of claim 1, wherein correction of the white list comprises removing an object from the white list based on a black list verdict.

8. The method of claim 1, wherein correction of the black list comprises removing an object from the black list based on a white list verdict.

9. A method for minimizing generation of false positive records during anti-malware processing, the method being performed on a computer having a processor and a memory, the method comprising:

creating a white list of clean objects and a black list of known malware objects;
based on a suspect object's metadata, generating a record pertaining to detection of the suspect object;
retrieving a record corresponding to the suspect object from the black list or from the white list;
providing the records to a false positive correction module;
calculating a probability of a false positive detection by the false positive correction module; and
generating a false positive verdict, wherein:
   corrections are made in the white list, if the suspect object deemed to be malicious based on the metadata; and
   corrections are made in the black list, if the suspect object deemed to be non-malicious based on the metadata.

10. A system for minimizing generation of false positive records during anti-malware processing on a computer having a processor and a memory, the system comprising the following software modules loaded into the memory:
   a detection system;
   a false positive detection module interfacing to the detection system;
   a false positive correction module;
   a defense module;
   a white list database accessible by the false positive detection module and by the false positive correction module;
   an antivirus (AV) record database coupled to the defense module and accessible by the false positive detection module and by the false positive correction module,
wherein:
the detection system generates a record pertaining to the detection of a suspect object based on the suspect object's metadata and the record is provided to the false positive detection module; and
a probability of a false positive detection is calculated by the false positive correction module using the white list or black list data provided by the false positive detection module;
a false positive verdict is generated by the false positive correction module based on the probability, wherein:
   corrections are made to the white list database, if the suspect object deemed to be malicious based on the suspect object's metadata; and
   corrections are made to the AV records database, if the suspect object deemed to be non-malicious based on the suspect object's metadata; and
wherein the defense module continues to use the corrected AV records database for protection against the malware.

11. The system of claim 10, wherein the probability is calculated using a weight coefficient tree.

* * * * *